Figure 1:
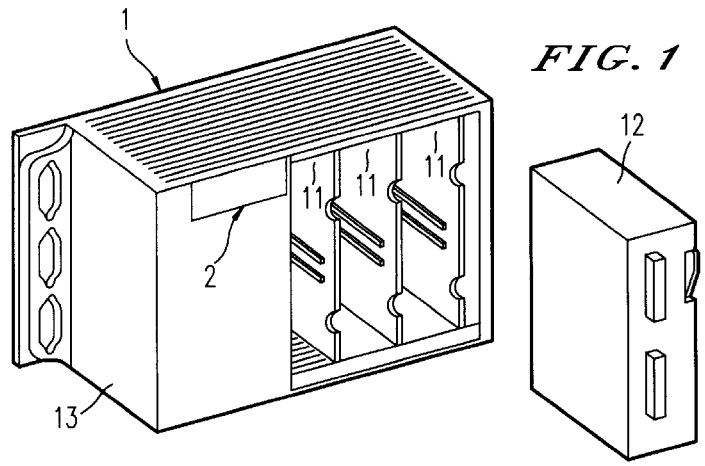

United States Patent [19]
Carpine et al.

[11] Patent Number: 6,160,528
[45] Date of Patent: Dec. 12, 2000

[54] DISPLAY APPARATUS FOR PROGRAMMABLE LOGIC CONTROLLERS

[75] Inventors: Alain Carpine, Valbonne; Alain Meurlay, Carros; Jean-Marie Chabert; Antonia Godicke, both of Valbonne; Christian Gosseaume, Biot, all of France

[73] Assignee: Schneider Automation, Valbonne, France

[21] Appl. No.: 08/875,605

[22] PCT Filed: Dec. 3, 1996

[86] PCT No.: PCT/FR96/01922

§ 371 Date: Aug. 5, 1997

§ 102(e) Date: Aug. 5, 1997

[87] PCT Pub. No.: WO97/21204

PCT Pub. Date: Jun. 12, 1997

[30] Foreign Application Priority Data

Dec. 5, 1995 [FR] France .................................. 95 14743

[51] Int. Cl.[7] ...................................................... G09G 3/14
[52] U.S. Cl. ................................................................ 345/46
[58] Field of Search ........................ 345/46, 82; 324/555, 324/556; 326/16, 37, 38

[56] References Cited

U.S. PATENT DOCUMENTS

| | | | |
|---|---|---|---|
| 3,641,390 | 2/1972 | Nakamura | 315/169 |
| 3,953,834 | 4/1976 | Burkett et al. | 340/172.5 |
| 4,165,534 | 8/1979 | Dummermuth et al. | 364/104 |
| 5,659,705 | 8/1997 | McNutt et al. | 395/442 |
| 5,765,000 | 6/1998 | Mitchell et al. | 395/739 |

*Primary Examiner*—Richard A. Hjerpe
*Assistant Examiner*—Ronald Laneau
*Attorney, Agent, or Firm*—Oblon, Spivak, McClelland, Maier & Neustadt, P.C.

[57] ABSTRACT

This invention relates to a display apparatus mounted on the front face of a programmable logic controller equipped with input-output modules or couplers (12) and characterized in that it is composed of a diode matrix (3) driven by an integrated display control circuit (4) linked by a series connection (S) to the digital-Boolean processor of the programmable logic controller (9).

7 Claims, 4 Drawing Sheets

DISPLAY APPARATUS FOR PROGRAMMABLE LOGIC CONTROLLERS

This invention relates to a display apparatus mounted on the front face of a programmable logic controller equipped with an input—output module.

Currently, programmable logic controllers have, on the front face, lamps which signal in particular the execution of the program, a processor fault, a memory fault or an input—output fault.

The programmable logic controllers designed to process multiple inputs-outputs have a modular structure based on one or several containers, which are joined to one another and which contain couplers or modules. The main rack houses the central processing unit and modules or couplers. Each coupler is connected, by means of physical input or output channels, to the operating part (sensors, actuators, etc.). There are several categories of couplers: simple couplers such as AON couplers (All Or Nothing inputs) and intelligent couplers which process the signals that they receive or emit.

Generally, the condition of the inputs-outputs of a coupler is displayed on its front face. This technology does not permit an overall view of the condition of the inputs-outputs.

The purpose of the invention is to provide a display unit located on the front face of the programmable logic controller and designed to provide a centralized display of the condition of the inputs-outputs of several modules. This unit makes operator dialogue possible as well as commands to be made via push buttons, all centrally. It is driven remotely via a series connection and powered from the mother board of the programmable logic controller, which means it may therefore be located remotely. The use of an Application Specific Integrated Circuit in the unit allows various displays to be made. It is possible to display the condition of the channels, the condition of the channel faults, the condition of the module or coupler, both for the base rack and extensions, to display other information in hexadecimal (time, Grafcet step, words, etc.) or even to display information by means of 7 segment displays. The display unit is compact.

The display unit of the invention is characterized in that it is composed of a matrix of diodes driven by an integrated display circuit linked by a series connection to the digital-Boolean processor of the programmable logic controller.

According to a feature of the invention, the diode matrix is divided into several zones of diode sub-matrices driven by the display control circuit, which receives from the digital-Boolean processor, via the series connection, a frame composed of an address specific to a zone, this address being associated to data which is representative of the inputs-outputs.

According to another feature of the invention, the apparatus has at least one control button connected to an input of the display control circuit.

Figure 2:
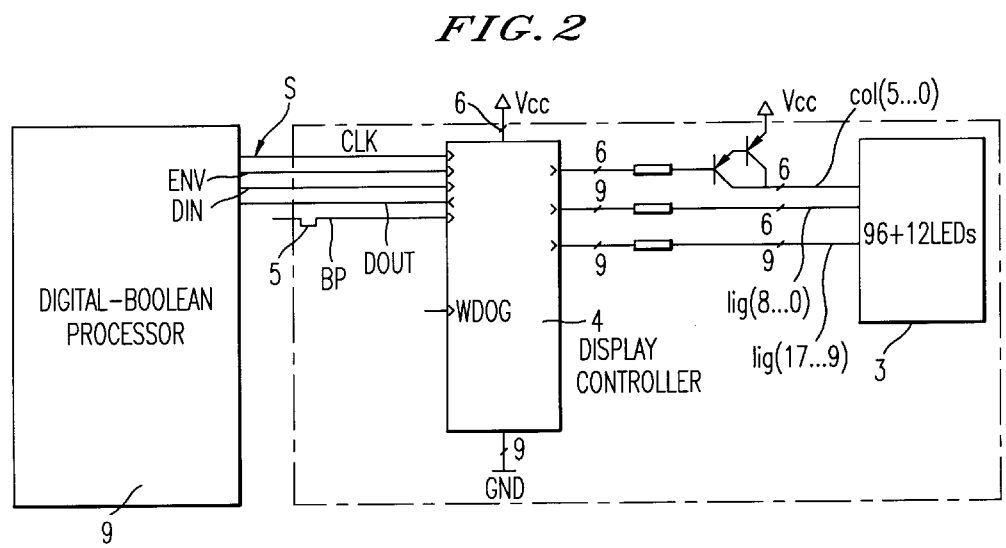
Figure 3:
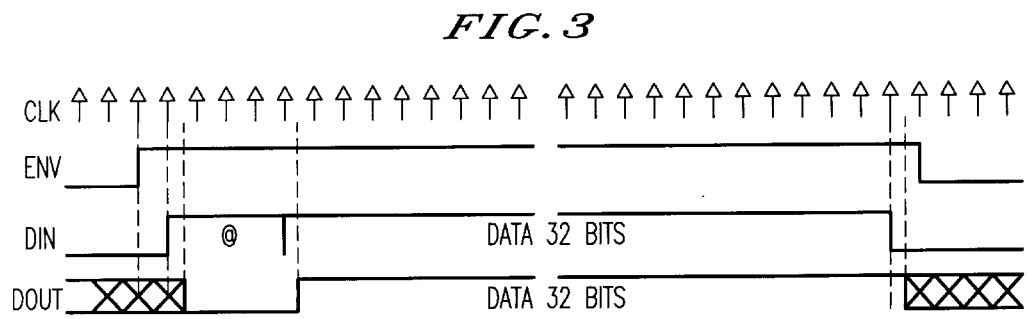
Figure 4:
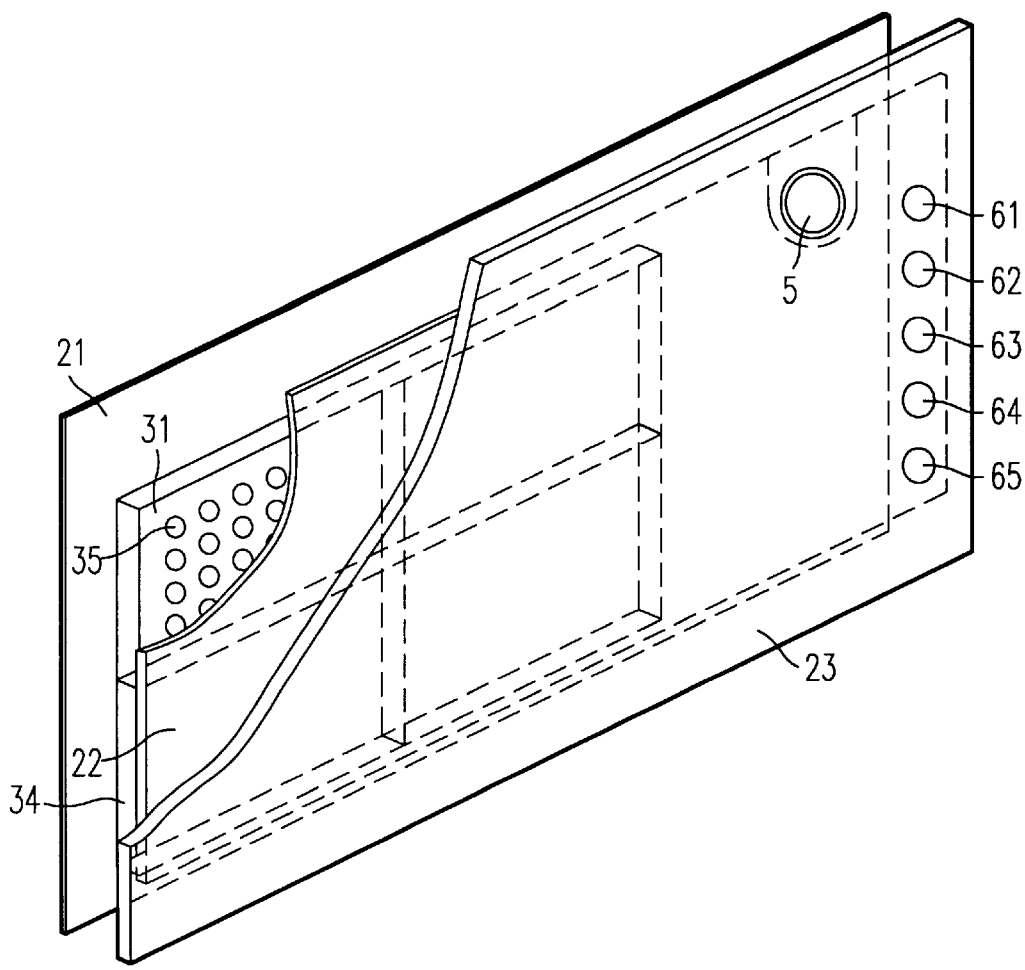
Figure 5:
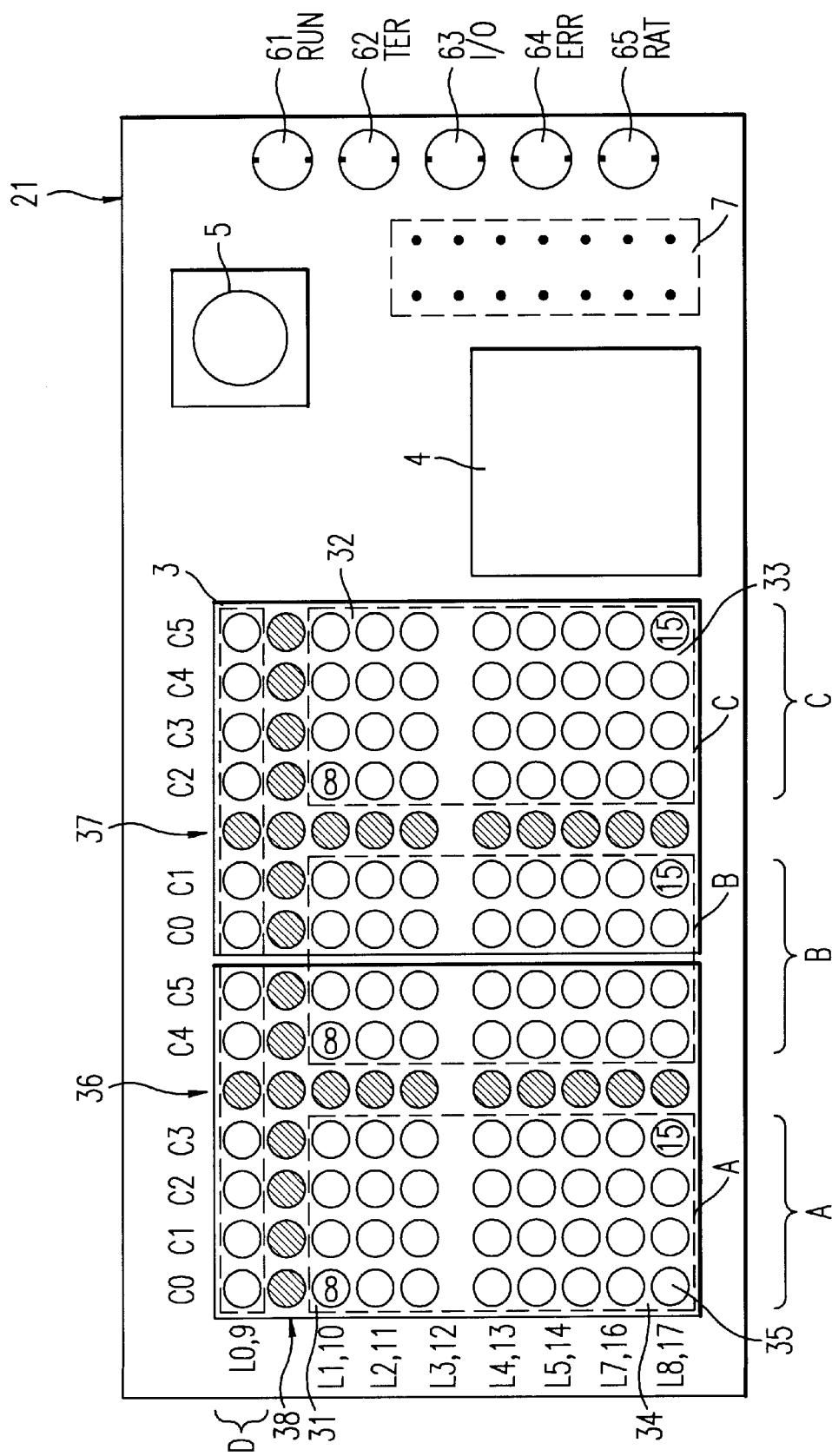
Figure 6:
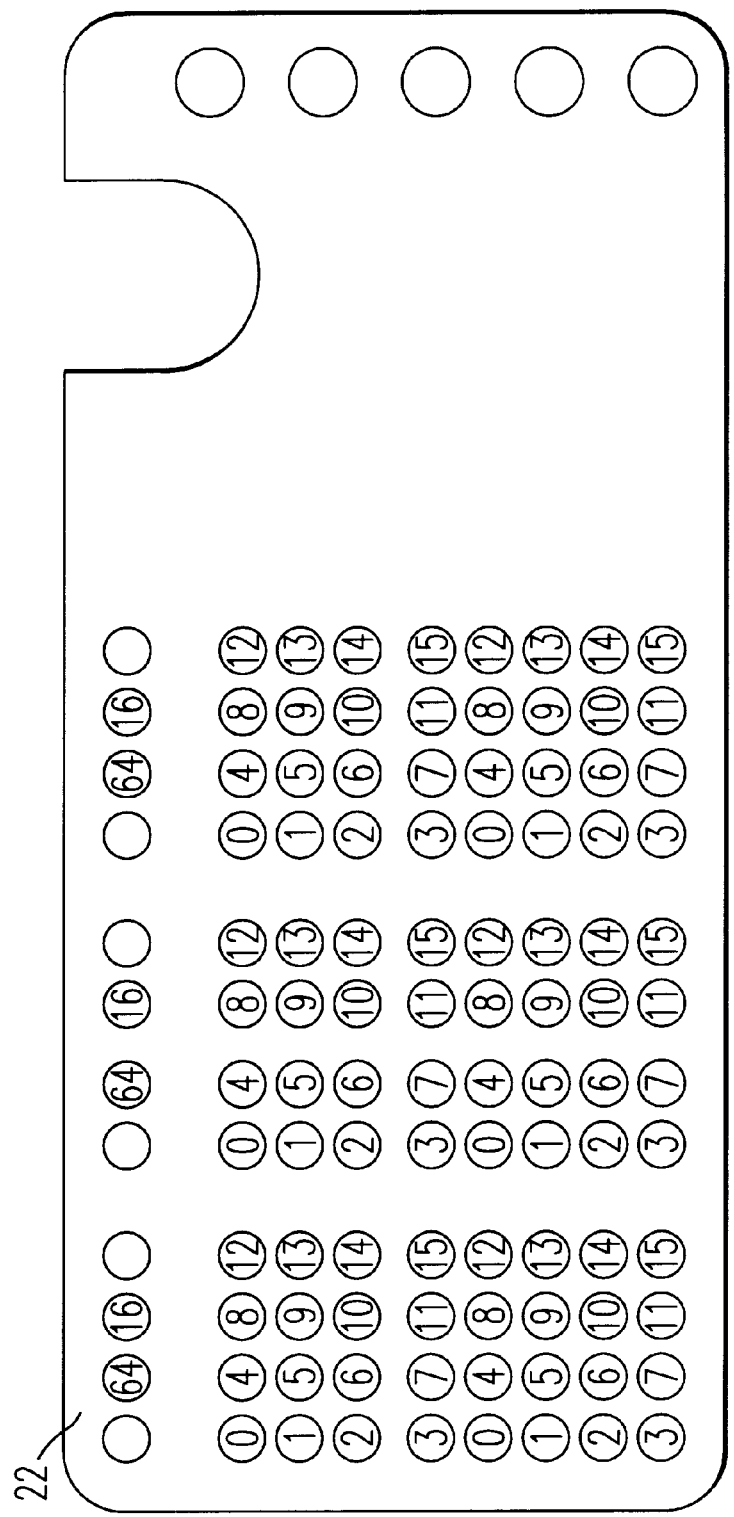

The invention will now be described in more detail by referring to an embodiment given by way of example and represented by the appended drawings, where:

FIG. 1 shows in perspective a programmable logic controller equipped with a display unit according to the invention, FIG. 2 is a functional diagram of the electronic circuit of the apparatus, FIG. 3 is a timing chart of the series connection of the apparatus, FIG. 4 is a perspective view of the various component parts of the apparatus, FIG. 5 is a diagram of the electronic board that the apparatus is equipped with, FIG. 6 is a diagram of the label fitted to the apparatus.

Referring to FIG. 1, the programmable logic controller fitted with the apparatus of the invention has a container 1 made of moulded, insulating material which forms modular compartments 11, in which functional modules or interface couplers such as 12 may be housed. The container 1 also has, on the left of the compartments 11, a compartment 13 for a central processing unit and a power supply.

The programmable logic controller has, on its front face, a display unit 2, the specific features of which will be described below.

The display of the inputs-outputs is made by a matrix 3 of display components 35, which here are of the Light Emitting Diode type (called LED for short). This matrix 3 is driven by an integrated display control circuit 4 which is an ASIC.

Referring to FIG. 4, matrix 3 is composed of a set (matrix) of diodes 35 located in four blocks of diodes 31, 32, 33, 34, each containing a set (matrix) of diodes 35, these blocks being joined to one another. The diode matrix has several zones or sub-matrices, A, B, C, which each contain the input-output signalling diodes of a same coupler. The apparatus can display the inputs/outputs of the three zones, A, B, C, at the same time. A fourth zone, marked D, is formed by a row of diodes which are each used to display service information.

It may also be noted that the contours of the diode zones A, B, C are not the same as the contours of the blocks 31, 32, 33, 34.

The matrix of diodes 3 has at least one row 38 and two columns 36, 37 of diodes which are not connected to the display control circuit 4 and which therefore remain inactive and which define the A, B, C, D diode zones used to display the conditions of the inputs-outputs.

The display control circuit 4 is linked by a series connection S to the digital-Boolean processor 9 of the programmable logic controller. This series connection is composed of 4 signals, CLK, ENV, DIN and DOUT. Referring to FIG. 3, the display control circuit 4 receives from the digital-Boolean processor 9, via the series connection S, a frame composed of an address specific to a zone, such as A, B or C, this address being associated to data bits which are representative of the inputs-outputs of a module.

The apparatus has a control button 5 which is connected to an input of the display control circuit 4.

Referring to FIG. 4, the apparatus has, at the rear, a base electronic board 21 which holds the diode matrix 3 and the display control circuit 4. This board 21 has discrete light emitting diodes 61, 62, 63, 64, 65, which are driven directly by the digital-Boolean processor 9 and which provide indications on the programmable logic controller. This board is linked by the connector 7 to the digital-Boolean processor 9. It houses the button 5.

The board 21 is situated behind a plastic label plate 22, which is marked with the numbers of the grouped inputs-outputs in zones which correspond to the zones A, B, C of the diode matrix 3. Each number is printed onto a transparent circular area on an opaque background.

The label plate 22 is itself situated behind a transparent plastic external cover 23 which is flush with the front face of the programmable logic controller. The end of the button 5 protrudes through this cover. The button 5 may be accessed through the cover.

The operation of the apparatus will now be explained.

The digital-Boolean processor 9 which drives the programmable logic controller communicates with an interface of the display control circuit 4, via the 4 signal CLK, ENV, DIN, DOUT series connection. Referring to FIG. 3, the interface of the circuit 4 receives from the processor 9 the time signal CLK, the frame of the address bits @ and data bits on DIN and the ENV signal, which is an envelope of the frame sent. The data bits of the DIN frame represent the inputs-outputs of a module and the display control circuit 4, after processing, sends the control signals to the diodes so that certain of them light up. These data bits are stored in circuit 4.

The address indicated in part @ of the DIN frame identifies the zone A, B, C, D and the data bits which are associated to this address correspond with the indications that should be given by the diodes situated in this zone. Thus a first address @ is followed by the diode values of the first zone A. A second address @ is followed by the diode values of the second zone B. A third address @ is followed by the diode values of the first zone C. A fourth address @ is followed by the diode values of zone D of the service diodes. By way of example, the high order bit will correspond to diode 15 (of one of the zones A, B or C, which is defined by the address), while the low order bit will correspond to the diode 000. The values of the diodes of the zone D are contained in the frame whose address defines this zone.

The display control circuit 4 receives, via the series connection S, the data bits of the inputs-outputs, deserialises them and, after processing, applies them to the diodes by means of multiplexing.

The display control circuit 4 send the digital-Boolean processor 9 a DOUT signal which contains in particular the condition of the push button 5.

A watchdog is installed on the circuit 4 to monitor the regular reception of the frames sent by the digital-Boolean processor 9. Each new frame resets it. As soon as it stops receiving the frames and after a wait period, the watchdog extinguishes all of the diodes.

It is of course understood that within the scope of this invention, variations and improvements to the details may be made imagined and the use of equivalent equipment envisaged.

What is claimed is:

1. A display apparatus for providing a centralized display of conditions of a plurality of inputs-outputs of at least one of a plurality of input-output modules and a plurality of couplers, the apparatus mounted on a programmable logic controller having the at least one of the plurality of input-output modules and the plurality of couplers, said display apparatus comprising:

a diode matrix including a plurality of diodes, said plurality of diodes driven by an integrated display control circuit linked by a series connection to a digital-Boolean processor of said programmable logic controller, wherein said diode matrix is divided into a plurality of first zones of diode sub-matrices; and a base electronic board which holds said diode matrix and said integrated display control circuit, said base electronic board linked via said series connection to a mother board of the programmable logic controller, said base electronic board situated behind a plastic label plate including numbers of grouped inputs-outputs in second zones which correspond to a group of said first zones of said diode matrix, said label plate situated behind an external, transparent plastic protective cover.

2. Apparatus of claim 1, wherein said control button is mounted on said base electronic board.

3. Apparatus according to claim 2, further comprising a watchdog fitted on said integrated display control circuit.

4. Apparatus according to claim 1, further comprising a watchdog fitted on said integrated display control circuit.

5. A display apparatus for providing a centralized display of conditions of a plurality of inputs-outputs of at least one of a plurality of input-output modules and a plurality of couplers, the apparatus mounted on a programmable logic controller having the at least one of the plurality of input-output modules and the plurality of couplers, said display apparatus comprising:

a diode matrix including a plurality of diodes, said plurality of diodes driven by an integrated display control circuit linked by a series connection to a digital-Boolean processor of said programmable logic controller, wherein said diode matrix is divided into a plurality of first zones of diode sub-matrices driven by said integrated display control circuit, wherein said integrated display control circuit receives from said digital-Boolean processor, via said series connection, a frame which includes an address specific to one of said first zones, wherein said address is associated to data which is representative of inputs-outputs; and a base electronic board which holds said diode matrix and said integrated display control circuit, said base electronic board linked via said series connection to a mother board of the programmable logic controller, said base electronic board situated behind a plastic label plate including numbers of grouped inputs-outputs in second zones which correspond to a group of said first zones of said diode matrix, said label plate situated behind an external, transparent plastic protective cover.

6. A display apparatus for providing a centralized display of conditions of a plurality of inputs-outputs of at least one of a plurality of input-output modules and a plurality of couplers, the apparatus mounted on a programmable logic controller having the at least one of the plurality of input-output modules and the plurality of couplers said display apparatus comprising:

a diode matrix including a plurality of diodes, said plurality of diodes driven by an integrated display control circuit linked by a series connection to a digital-Boolean processor of said programmable logic controller, wherein said diode matrix is divided into a plurality of first zones of diode sub-matrices;

at least one control button connected to an input of said integrated display control circuit; and a base electronic board which holds said diode matrix and said integrated display control circuit, said base electronic board linked via said series connection to a mother board of the programmable logic controller, said base electronic board situated behind a plastic label plate including numbers of grouped inputs-outputs in second zones which correspond to a group of said first zones of said diode matrix, said label plate situated behind an external, transparent plastic protective cover.

7. A display apparatus for providing a centralized display of conditions of a plurality of inputs-outputs of at least one of a plurality of input-output modules and a plurality of couplers, the apparatus mounted on a programmable logic controller having the at least one of the plurality of input-output modules and the plurality of couplers, said display apparatus comprising:

a diode matrix including a plurality of diodes, said plurality of diodes driven by an integrated display control circuit linked by a series connection to a digital- Boolean processor of said programmable logic controller, wherein said diode matrix includes a plurality of blocks of diode sub-matrices, wherein said diode matrix is divided into a plurality of first zones of diode sub-matrices, wherein each one of said plurality of blocks is located adjacent to at least one other of said blocks, and wherein contours of said blocks are different from contours of said first zones; and a base electronic board which holds said diode matrix and said integrated display control circuit, said base electronic board linked via said series connection to a mother board of the programmable logic controller, said base electronic board situated behind a plastic label plate including numbers of grouped inputs-outputs in second zones which correspond to a group of said first zones of said diode matrix, said label plate situated behind an external, transparent plastic protective cover.

* * * * *